United States Patent [19]

Schneider

[11] 4,161,729
[45] Jul. 17, 1979

[54] BEACON ADD-ON SUBSYSTEM FOR COLLISION AVOIDANCE SYSTEM

[76] Inventor: Bernard A. Schneider, 8984 Bellefontaine Rd., Dayton, Ohio 45424

[21] Appl. No.: 876,443

[22] Filed: Feb. 9, 1978

[51] Int. Cl.² .............................................. G01S 9/56
[52] U.S. Cl. ........................... 343/6.5 R; 343/112 CA
[58] Field of Search ........ 343/6.5 R, 6.5 LC, 112 CA

[56] References Cited

U.S. PATENT DOCUMENTS

| | | | |
|---|---|---|---|
| 3,579,235 | 5/1971 | Straub et al. | 343/6.5 LC |
| 3,792,472 | 2/1974 | Payne et al. | 343/6.5 LC |
| 3,875,570 | 4/1975 | Litchford | 343/6.5 LC |
| 3,882,497 | 5/1975 | Klass et al. | 343/6.5 LC |
| 3,959,793 | 5/1976 | Litchford | 343/6.5 LC X |
| 4,107,674 | 8/1978 | Funatsu et al. | 343/6.5 R |

*Primary Examiner*—T. H. Tubbesing
*Attorney, Agent, or Firm*—Joseph E. Rusz; Robert Kern Duncan

[57] ABSTRACT

By adding an indicator control panel to the cockpit and a small receiver-decoder unit between the transponder and the antenna of aircraft having a conventional air traffic control radar beacon system transponder, mid-air collision avoidance capability is obtained. The BACAS (Beacon Add-on Subsystem for Collision Avoidance System) receiver-decoder unit in an aircraft interrogates the associated ATC (Air Traffic Control) transponder to obtain and store the ATCRBS Mode C reply altitude information. The 1090 MHz transponder Mode C reply is given 5 MHz on-off amplitude modulation by the receiver-decoder unit and is radiated into space through the ATC antenna. Identical BASCAS hardware in aircraft within range sense the specially-modulated (5 MHz), Mode C reply and immediately act to trigger their respective ATC transponders into emitting Mode C replies with essentially the same special modulation characteristics except for a different modulation frequency (10 MHz). The replies emitted by other aircraft are sensed by the BASCAS receiver in the initial aircraft, and the Mode C altitude information from each aircraft is compared to the initially stored Mode C data. Any aircraft within a relatively small radius having an altitude separation of 500 feet or less will cause a BASCAS unit to alert the pilot. The BASCAS unit will also illuminate a "CLIMB" or "DIVE" light when the relative altitude orientation can be determined from the altitude data comparison.

4 Claims, 16 Drawing Figures

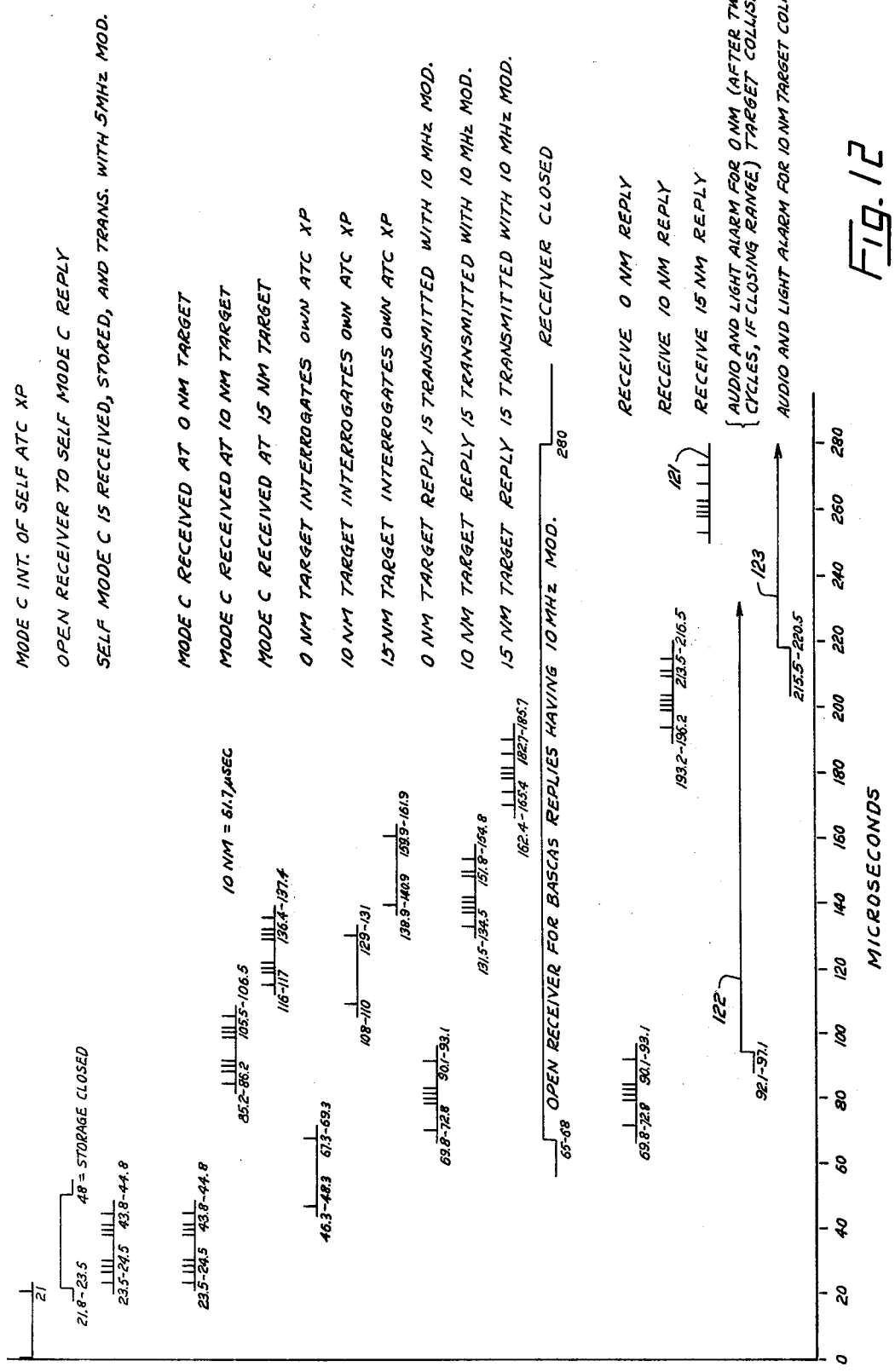

BEACON ADD-ON SUBSYSTEM FOR COLLISION AVOIDANCE SYSTEM

RIGHTS OF THE GOVERNMENT

The invention described herein may be manufactured or used by or for the Government of the United States for all governmental purposes without the payment of any royalty.

BACKGROUND OF THE INVENTION

The field of the invention is in the electronic collision avoidance art.

At the present day, both the Federal Aviation Agency (FAA) and Department of Defense (DOD) use the air traffic control radar beacon system (ATCRBS) as the primary means of controlling U.S. air traffic. The ATCRBS network consists of nearly 700 ground stations, 184,000 aircraft transponders, and 108,000 altitude encoders for Mode C altitude reporting. It is estimated that DOD owns 108,000 transponders. The U.S. ATCRBS hardware is compatible with the Secondary Surveillance Radar (SSR) international air traffic control system governed by the International Civil Aviation Organization (ICAO).

At least one U.S. pilot experiences a near miss incident every day. A solution to provide a collision-avoidance capability for all aircraft—commercial, business, private, foreign, and military-13 has been needed and, for economic reasons, should make use, if possible, of the existing on-board ATCRBS equipment.

The FAA has studied two developmental beacon collision-avoidance systems (BCAS)- (1) Litchford trimodal (active, passive, active and passive) BCAS, and (2) Miter/FAA active BCAS (A-BCAS). Each system is relatively expensive, due to using sophisticated and complex hardware. For additional background on these systems see: "Avoiding Mid-Air Collisions" by Litchford, George G., IEEE Spectrum, 41, September 1975 and "Collision Avoidance System Evaluated" by Klass, Philip J., Aviation Week and Space Technology, 55, Mar. 1, 1976. The following patents set forth the best known art available in regard to the present invention. U.S. Pat. No. 4,021,802 to patentee George B. Litchford; U.S. Pat. No. 3,882,497 to patentees Klass et al; U.S. Pat. No. 3,792,472 to patentees Payne et al; and U.S. Pat. No. 3,208,064 to patentee John S. Morrel.

Generally the prior art systems, if carried by all large aircraft, will protect large aircraft from each other and small aircraft, but the very high costs of these systems prohibit their general acceptance by all aircraft owners. The presently disclosed system at a cost per installation of less than approximately onetenth the prior art systems provides a practical system for all aircraft owners.

SUMMARY OF THE INVENTION

The invention is a reliable, physically small, easily installed, lightweight, economical in cost and operation, mid-air collision avoidance system that functions with existing air traffic control transponders used in conventional air traffic control radar beacon systems. Typical anunciation of an impending collision is by an alarm buzzer and a tone in the crews' headsets. In addition CLIMB or DIVE lights indicate the best evasive maneuver to the pilot.

The invention (BASCAS) interrogation has an insignificant effect on the aircraft's normal ATC transponder response because the BASCAS interrogation is on one frequency (1090 MHz) whereas the ATC transponder receiver is tuned to another frequency (1030 MHz). Thus, only the BASCAS unit receives the interrogation. The BASCAS receiver/processor only recognizes Mode C (i.e., 1090 MHz) replies with determined modulation-on-pulse (i.e., such as 5 MHz or 10 MHz modulation), thus, BASCAS does not "reply" to normal Mode C signals. BASCAS operation, (typically and preferably), once every two seconds has an insignificant effect on normal ATCRBS (or other BCAS) systems and is completely compatible. The BASCAS "active" period is typically 1000 microseconds duration—that is the time in which the particular BASCAS unit challenges other aircraft and receiver/processes replies. The BASCAS unit will not respond to BASCAS interrogations, from other planes, during this time. The BASCAS "passive" period, approximately 1.999 seconds duration, is the interval between interrogations in which the BASCAS replies to BASCAS interrogations from other aircraft. It is to be noted that the operation of any BASCAS is such that the unit is available to provide replies 99.95% of the time and that the active period consumes only 0.05% of the total time.

BRIEF DESCRIPTION OF THE DRAWING

FIG. 12 is a schematic, graphical, illustration of a typical operational sequence of a first 280 microsecond time interval of one (typically two second) operating period;

DESCRIPTION OF THE PREFERRED EMBODIMENT

Figure 1:
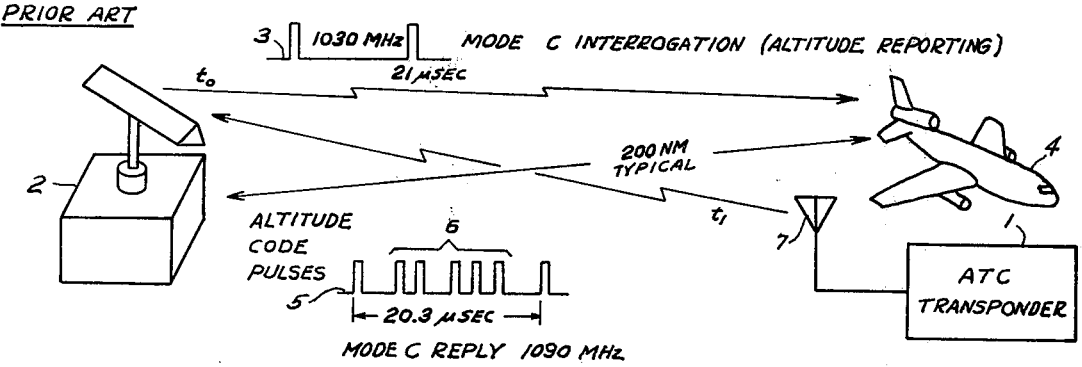
FIG. 1 is a pictorial representation of a typical prior art air traffic control radar beacon system (ATCRBS)

FIG. 1 pictorially illustrates the prior art air traffic control radar beacon system (ATCRBS) and the air traffic control (ATC) transponder 1 carried by almost all U.S. aircraft. Such systems typically operate over distances up to approximately 200 NM (nautical miles) from the air traffic control center 2. The traffic control center 2 directs a Mode C interrogation signal 3 to the transponder 1 of plane 4 which replies with a Mode C reply signal 5 having altitude information code pulses 6. That is the well known currently in use system. In this invention a receiver-decoder unit is inserted in the coaxial lead from the aircraft transponder 1 to the antenna 7 to provide the pilot of the aircraft with a mid-air collision avoidance system. The collision avoidance system of this invention has been termed BASCAS, i.e., Beacon Add-on Subsystem for Collision Avoidance System. The system provides collision-avoidance capability to similarly equipped aircraft by taking advantage of the U.S. air traffic control radar beacon system (ATCRBS) technique and the ATC transponders carried by almost all U.S. aircraft. Altitude-coded emissions from transponders are used to determine presence and altitude orientation of aircraft within a 15 NM radius of each BASCAS-equipped aircraft. The pilot is provided with an aural warning of an impending collision and is given an evasive maneuver direction.

Figure 2:
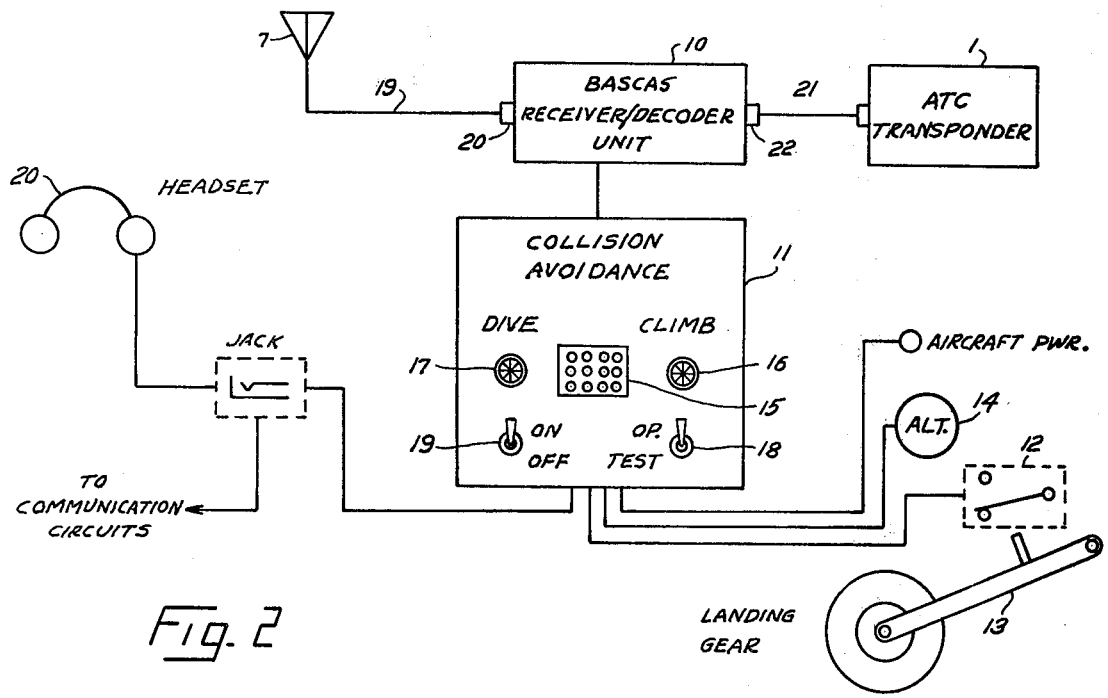
FIG. 2 is a block-pictorial schematic diagram illustrating the cooperation of an embodiment of the invention with on-board equipment.
Figure 4:
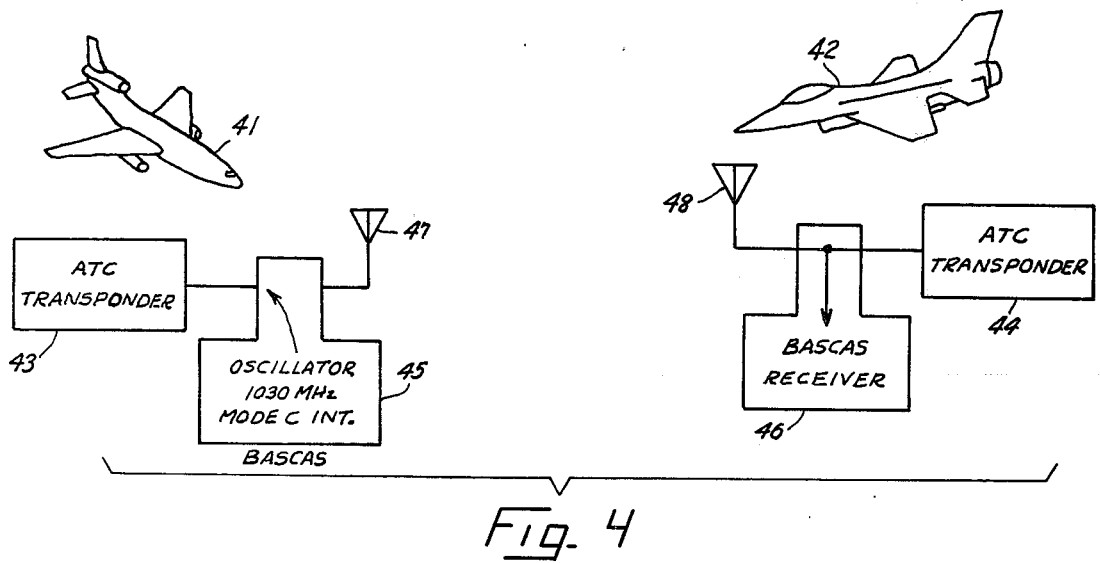
FIG. 4 is a pictorial-schematic diagram illustrating a typical first step in the operational sequence of the invention.

A typical BASCAS installation as illustrated in FIG. 2 consists of two hardware pieces—a receiver-decoder unit 10 which is connected between the aircraft ATC transponder 1 and the antenna 7, and a cockpit indicator control panel 11. It is highly desirable to have a switch 12 cooperating with the landing gear 13 to inhibit BASCAS operation when the aircraft is on or near the ground. Also, it is generally desirable to have the coded altitude information from the aircraft altimeter 14 inhibit BASCAS operation at low altitudes and to inhibit the DIVE light at relatively low altitudes.

The indicator control panel 11 has a conventional loud buzzer warning device 15 to alert the pilot. Two lights, CLIMB 16 and DIVE 17 are also on the panel 11. One light will illuminate to instruct the pilot in the appropriate evasive direction. A Test switch 18 is generally desired to provide a hardware built-in-test capability.

The receiver-decoder 10 unit is of small size and is usually mounted near the ATC transponder 1. The transponder antenna coaxial cable 19 is removed from the transponder 1 and is connected to the BASCAS receiver-decoder antenna port 20. A second coaxial cable 21 is added to connect the BASCAS receiver-decoder transponder port 22 to the ATC transponder 1.

In operation the BASCAS unit 10 interrogates its associated ATC transponder 1 at a relatively low rate to obtain and store Mode C altitude information. The BASCAS unit 10 adds sine-wave modulation (modulation-on-pulse) at a determined modulation frequency to the 0.45 microsecond reply pulses from the ATC transponder 1. These reply pulses are detected in the receiver of the BASCAS unit 10 and the Mode C altitude code is stored, also in the unit 10. Simultaneously, the modulated Mode C reply from the ATC transponder 1 that is modulated by the BASCAS unit 10 is transmitted into space through the on-board ATCRBS conventional antenna 7 as an interrogation signal to other aircraft.

The specially-modulated Mode C reply interrogation signal is detected by other BASCAS-equipped aircraft within typically a 15 to 45 MN radius. The modulation frequency added to the Mode C reply pulses establishes the nature of the signal as being a "BASCAS interrogation" and the receiving aircraft respond by triggering their associated ATC transponders into emitting Mode C replies to which similar modulation is added. These "BASCAS replies" have a slightly different frequency of modulation which establishes their characteristic as a reply. Modulation frequencies within the range of 5 to 10 MHz are generally suitable for either interrogation or reply.

Incoming "BASCAS replies" from aircraft within a 15 NM radius, (it is generally desirable to limit the reception of replies to only those aircraft within 15 NM), are detected by the receiver of the challenging BASCAS unit. The altitude of the replies are compared to the stored Mode C altitude code. If the code comparison indicates less than typically a 500 feet altitude separation, the pilot alert buzzer 15 is activated when successive reply returns are occurring in progressively shorter time intervals indicating that the co-altitude aircraft is closing in range with the challenging aircraft.

The switch 12, appropriate for the particular aircraft, is mounted onto or near the aircraft landing gear such that lowering of the gear provides an inhibiting signal to the BASCAS unit. Inhibiting of BASCAS operation on or very near the ground, i.e., both interrogations and replies, prevents unwanted operation and reduces the chances for false alarms. The BASCAS unit can accept an altitude code from the aircraft altimeter, if the altimeter provides such output, which will inhibit the DIVE light at low altitudes. The BASCAS unit power ON-OFF switch is normally left in the ON position; however, the unit can be turned off, if required by FAA, within controlled air space.

Generally, it has been found desirable to alert the pilot by a warning tone in his headset 20 in addition to the warning provided by the indicator control panel buzzer 15.

In addition to aurally warning the pilot of an impending collision, the BASCAS unit also analyzes the stored and incoming reply altitude codes to determine the best collision avoidance maneuver. The appropriate light, 16 or 17, CLIMB or DIVE, will illuminate on the cockpit BASCAS panel, depending upon whether the opposing aircraft is below or above the challenger.

DETAILED OPERATION OF A TYPICAL SPECIFIC EMBODIMENT

In the following detailed discussion of a typical specific embodiment of the invention generally preferred frequencies, repetion rates, amplitudes, ranges, duty cycles and other necessary parameters will be given in specific dimensions. It is to be understood that these figures and the examples of operation are set forth by way of illustration and that only if so stated are the mentioned values critical. It is also to be understood that these enumerated values are stated to present an example and are not to be considered limiting to the scope of the invention which is set forth in the appended claims. The operation of the invention is described in cooperation with the currently FAA accepted and in-use ATCRBS parameters. For use with different ATCRBS parameters, those skilled in the art will readily adapt the disclosed device, all within the scope of the contemplated invention.

Figure 3:
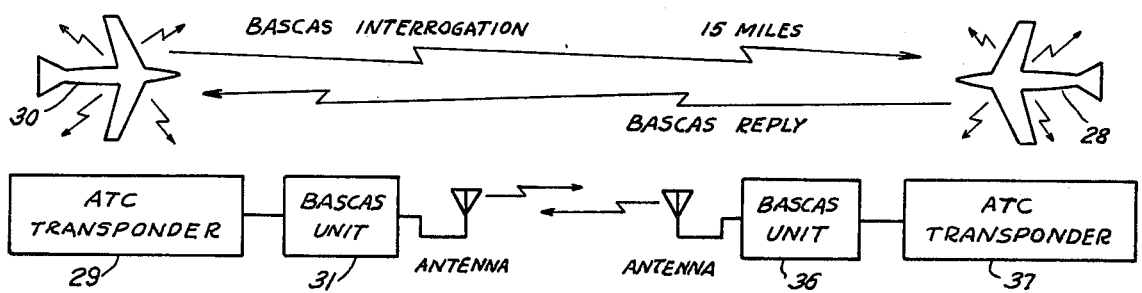
FIG. 3 is a simplified pictorial-schematic diagram illustrating typical mid-air operation of an embodiment of the invention in each of two aircraft.
Figures 3A, 3B:
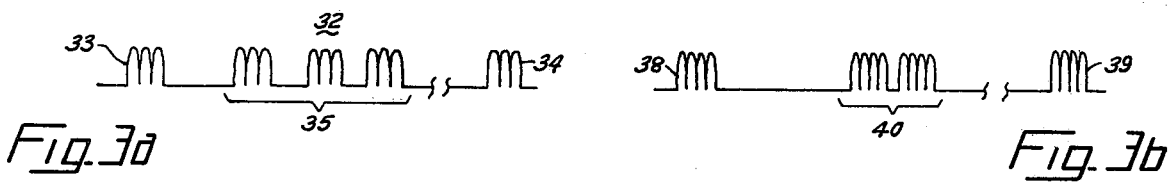
FIG. 3a schematically represents the interrogation.
FIG. 3b schematically represents the reply.

The basic operation of BASCAS is illustrated in simplified schematic form in FIGS. 3, 3a, and 3b. Two aircraft 30 and 28 are in mid-air flight at a separation of approximately 15 nautical miles. The BASCAS unit 31 of aircraft 30 self interrogates its associated ATC transponder 29 and causes a BASCAS interrogation signal as shown in FIG. 3a to be radiated. The interrogation signal 32 is self mode C reply of conventional Mode C characteristics, i.e., a 20.3 μsec signal pulse train at 1090 MHz having standard 0.45 μsec bracket pulses 33 and 34 with conventional altitude code pulse train 35; *except* for the fact that the pulse train carries a 5 MHz modulation.

The BASCAS unit 36 in aircraft 28 recognizes this Mode C signal that has a 5 MHz modulation on pulse characteristic as a challenging signal and causes its associated ATC transponder 37 to generate a standard Mode C reply onto which the BASCAS unit 36 places a 10 MHz modulation. The reply signal from aircraft 28 is represented by FIG. 3b. The reply signal as shown in FIG. 3b comprises, 0.45 μsecond pulses spaced apart 20.3 μseconds, bracket pulses 38 and 39 and the coded altitude pulses 40 (indicating aircraft 28's altitude). It is a conventional 1090 MHz Mode C reply signal except for having the 10 MHz modulation on the pulses.

Typically, each BASCAS unit operates actively, i.e., sends out an interrogation pulse, every two seconds. This rate is adequate for satisfactory collision warning time between fast-moving aircraft yet has little, if any, impact on normal operation of the associated ATC transponder (most transponders can operate at least at 1000 to 1200 Hz). Consider two high-speed aircraft closing from 15 NM at 1000 knots. Each pilot has roughly 54 seconds to react to a collision warning. During the 7.5 NM closing distance of each aircraft, the BASCAS units each can provide a collision warning every 1688 feet; or 26 times. As soon as 500 feet in altitude separation is gained, the BASCAS warning ceases.

Typically, the BASCAS unit adds a maximum of 2 dB signal attenuation to the ATC transponder installation; therefore, the impact on ATCRBS operation is insignificant. Typically, ATCRBS hardware is capable of 775 NM operation yet 200 NM is the required operating range per U.S. aviation standards.

A representative sequence of events and operations in a typical BASCAS operating cycle is best understood when described in reference to FIGS. 4 through 11. Starting with FIG. 4, aircraft 41 and 42 have conventional ATC transponders 43 and 44 and BASCAS units 45 and 46. While both aircraft will be periodically challenging and responding, in this description of a typical operating cycle aircraft 41 will be challenging aircraft 42.

Figure 10:
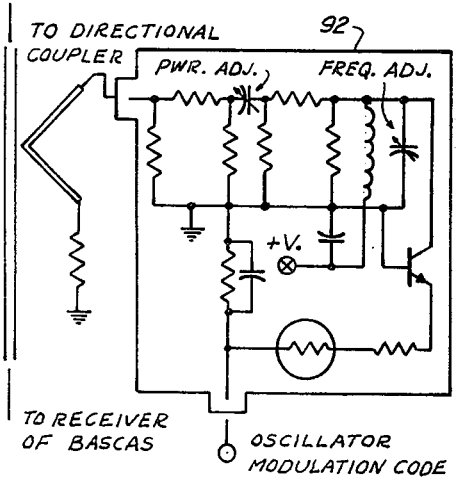
FIG. 10 is a schematic diagram of a suitable, typical, (self) interrogation code oscillator.

Every two seconds, the timing and control circuitry 91 (FIG. 9) in the BASCAS receiver-decoder unit 45 initiates an operating cycle by providing a standard Mode C interrogation pulse pair (two 0.8 microsecond pulses spaced 21 microseconds) code to the Mode C interrogation generator 92. The Mode C interrogation generator 92 is typically a one-transistor 1030±3 MHz oscillator as shown in FIG. 10 providing roughly −20 dBm output power. The valid Mode C interrogation is coupled to the ATC transponder through the 30 dB path of the conventional directional coupler 93. The high-power PIN diode modulator circuitry 94 is not activated at this time, and, since the modulator is designed to rest in the direct path state, the interrogation is directly coupled to the ATC transponder 43.

Figure 5:
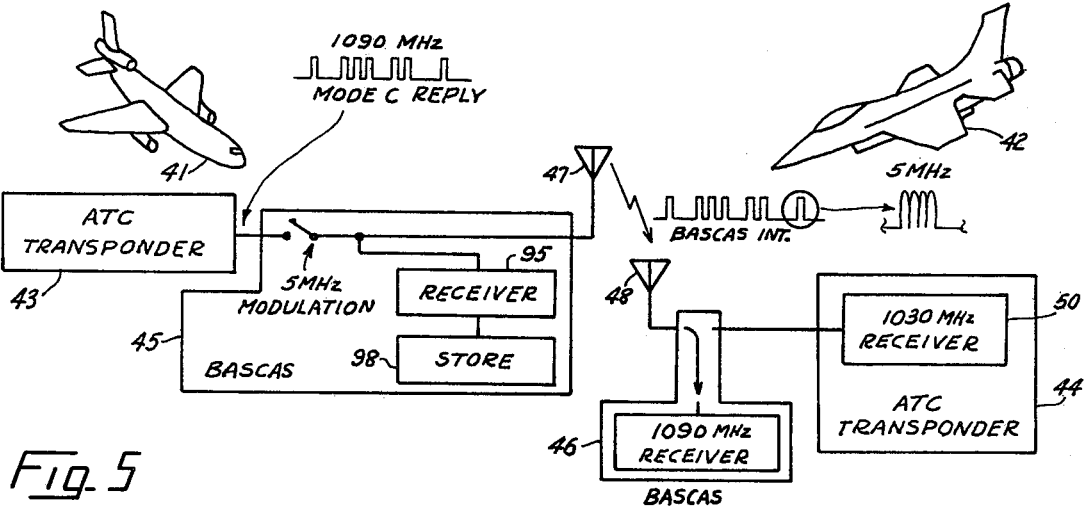
FIG. 5 is a pictorial-schematic diagram illustrating a typical second step in the operational sequence of the invention.

Referring now to FIG. 5, after being triggered at the start of the BASCAS operating cycle (time equals $t_o$) by the BASCAS receiver-decoder unit 45, the ATC transponder 43 requires 3.0 microseconds to generate a reply. The BASCAS unit is enabled during the period ($t_o+24$ μsec) to ($t_o+48$ μsec) to accept the reply. The highpower PIN diode modulator 94 is also enabled during the time the reply is transmitted. The modulator adds 20 dB sine-wave down modulation to the reply pulses. The ATC transponder's RF energy is shunted into a 20 watt, 50 ohm resistive load 111 during the off cycle of the modulator to prevent transponder damage due to transmitter load mismatch. The modulator 94 has a nominal 1 dB path loss in the ON state. The frequency of modulation-on-pulse (MOP) is at an interrogation frequency, typically 5 MHz. (The reply frequency is typically 10 MHz.)

The 1090 MHz Mode C reply from the ATC transponder is directly coupled to the aircraft antenna 47 via the 0.5 dB path of the BASCAS unit directional coupler 93. Simultaneously, the modulated reply is received by the BASCAS receiver 95 through the 30 dB path of the directional coupler.

To meet the generally preferred operational requirements previously set forth, the receiver 95 sensitivity must be at least −82 dBm (sensitivity needed to detect a BASCAS reply of −72 dBm at the antenna connector and to generate a warning). Fourteen nautical miles range is available under worst case conditions. Also to meet these typical parameters the receiver bandwidth should be approximately 20 MHz to detect the modulated pulse signal energy.

The modulated reply pulses provide video pulses modulated at 5 MHz. These signals are passed to a conventional MOP (pulse) detector 96 which contains sharply-tuned filters to detect and pass only the modulated pulses while rejecting unwanted signals. This technique yields some degree of interference rejection and false alarm protection. The altitude pulses are decoded in conventional pulse decoder 97 and stored in the conventional code storage register 98.

At roughly 44 microseconds into the BASCAS operating cycle ($t_o + 44$ μsec), the ATC transponder Mode C altitude information is locked into a digital code storage register 98. The BASCAS unit is then temporarily disabled while events happen at other aircraft in the vicinity.

At any BASCAS-equipped aircraft within operating range such as aircraft 42, the modulated 1090 MHz Mode C reply (BASCAS interrogation) is detected by its BASCAS receiver 46 (not by its ATC transponder 44 whose receiver 50 is turned to 1030 MHz). If the receiving BASCAS unit is not operating within one of its own operating cycles, the BASCAS interrogation is detected and the 20.3 microsecond bracket pulses are decoded. The bracket-pulse decode and the appropriate interrogation MOP frequency cause a BASCAS unit to initiate a BASCAS "reply".

Figure 6:
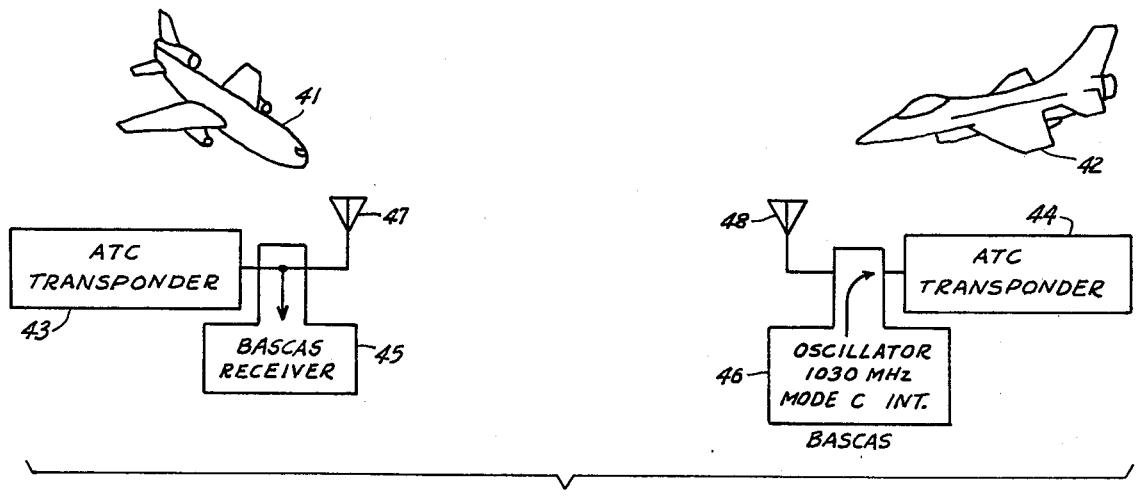
FIG. 6 is a pictorial-schematic diagram illustrating a typical third step in the operational sequence of the invention.
Figure 7:
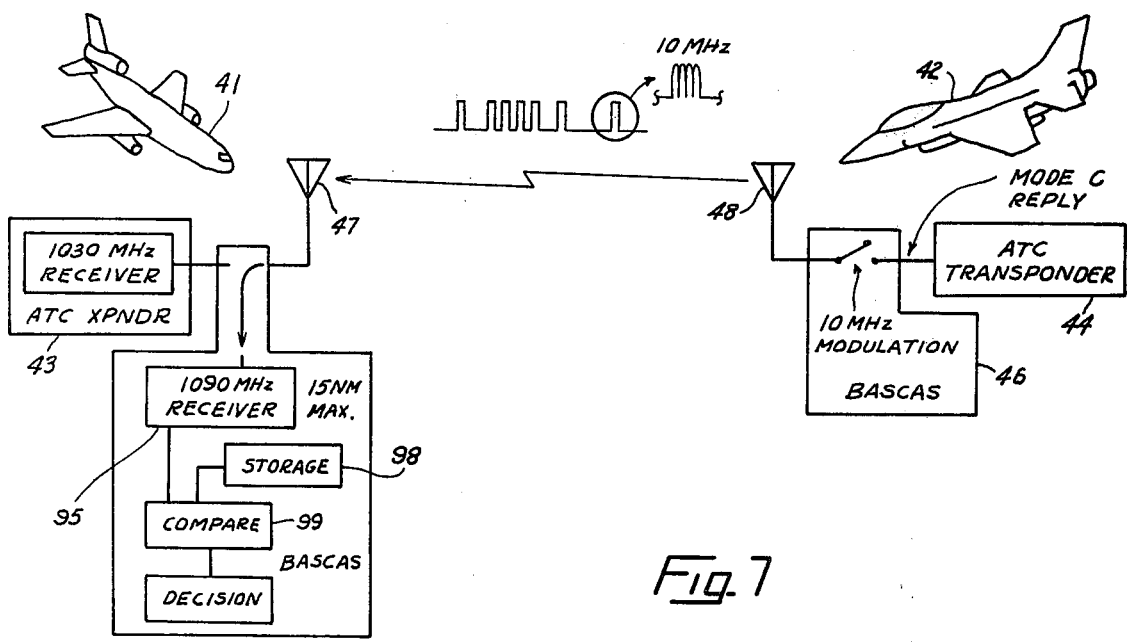
FIG. 7 is a pictorial-schematic diagram illustrating a typical fourth step in the operational sequence of the invention.

Referring now to FIG. 6, to provide a reply to a challenging aircraft, the BASCAS 46 unit will enable, within 3±0.5 microseconds, its Mode C interrogation generator which, in turn, elicits a Mode C reply from its associated ATC transponder 44. The reply is modulated by its PIN diode modulator, with a sine-wave MOP modulation similar to a BASCAS interrogation, except the modulation frequency is the reply frequency, 10 MHz, as illustrated in FIG. 7.

The BASCAS unit 45 in the challenging aircraft 41 is re-enabled during the period $(t_o+65 \mu sec)$ to $(t_o+280 \mu sec)$ of the BASCAS operating cycle to accomodate incoming BASCAS replies within up to 15 NM range. Each reply is detected (by detecting the special reply MOP frequency (10 MHz), and the 20.3 $\mu$sec bracket pulses) and is compared in comparator 99, to the initially-stored self Mode C code. Specifically, Mode C reply pulses $A_1$, $A_2$, $A_4$, $B_1$, $B_2$, $B_4$, $D_4$ are compared in conventional comparator 99. If all digits are identical, an aircraft in the vicinity has an altitude with separation of 500 feet or less. Conventional processing circuitry in the comparator 99 examines Mode C reply digits $C_1$, $C_2$, $C_4$ which indicates elevation orientation. (See U.S. National Aviation Standard for the Mark X (SIF ATCRBS) Characteristics by FAA, dated Mar. 8, 1971.)

When sensing an altitude separation of 500 feet or less to any aircraft within a 15 NM range, the timing and control circuitry 91 stores a data pulse in range rate circuit 100 to indicate the range of the threat aircraft. If, during the next BASCAS interrogation cycle, the target appears to be closing on the challenging aircraft, i.e., a shorter time interval, than in the previous cycle, between transmission of the challenge and the receiving of the reply, the timing and control circuitry activates the BASCAS control panel buzzer 15 and pilot headset audio warning 20. The pilot audio warning is typically a tone of approximately 1000 Hz. Both warnings are conventionally made to last typically two seconds unless reinitiated by another BASCAS warning cycle. If the BASCAS unit can establish the appropriate evasive maneuver direction, the CLIMB or DIVE light 16 or 17 will illuminate for two seconds. The light will also reinitiate if another warning and decision cycle occurs. It is conceivable that two aircraft could share the same Mode C altitude code. In this situation, the BASCAS unit may not be able to provide an evasive maneuver indication. The CLIMB and DIVE lights then will not illuminate but the aural warnings will be sounded.

Figure 8:
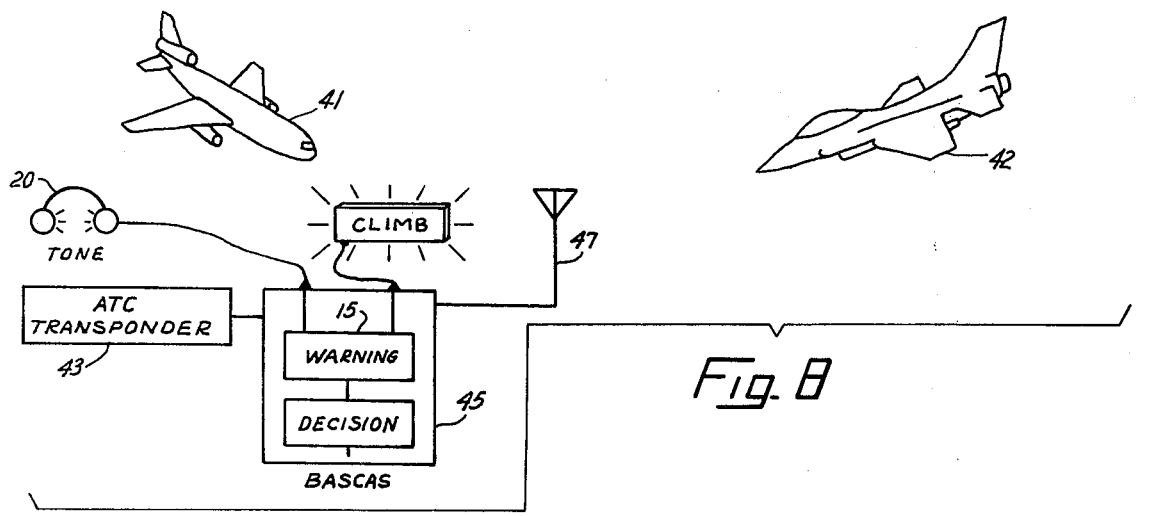
FIG. 8 is a pictorial-schematic diagram illustrating a typical fifth and last step in the operational sequence of the operation.

Referring to FIG. 8, in the BASCAS unit 45 of aircraft 41, the Mode C comparator 99 has determined that aircraft 42 is at an altitude within 500 feet of its own altitude and is lower. Circuits 100 have also determined that the rate of change of range is negative, i.e., decreasing, and thus the best maneuver for aircraft 41 is to climb.

The BASCAS unit receives replies from 65 $\mu$sec up to 280 microseconds after the start of the operating cycle. Alarm generation is accomplished within 2 to 4 microseconds of a detected alarm condition. The BASCAS unit is temporarily disabled from $(t_o+280 \mu sec)$ to $(t_o+1000 \mu sec)$, at which time the BASCAS active operating cycle ends. The 720 microseconds disabled time is needed to prevent the BASCAS unit from inadvertently acting as a BASCAS transponder to incoming BASCAS replies from aircraft up to 70 NM from the challenging aircraft.

At the end of $t_o+1000$ $\mu$sec in the BASCAS cycle, the receiver-decoder automatically reverts to a passive mode wherein the device can provide BASCAS replies to other aircraft BASCAS interrogations. Each incoming modulated Mode C reply (20.3 $\mu$sec bracket pulses) of the correct MOP frequency (5 MHz) will cause the unit to trigger a modulated Mode C reply from its associated ATC transponder. No reply will be generated if the BASCAS unit is being inhibited from the landing gear switch, low altitude sensor, etc.

FIG. 12 illustrates a series of events for a hypothetical case involving the first 280 $\mu$secs of a challenging BASCAS equipped aircraft with three other BASCAS equipped aircraft. The three replying target aircraft are assumed to be, first at substantially 0 (zero) nautical miles distance, second at ten nautical miles distance, and third at fifteen nautical miles distance. Note that the reply 121 from the aircraft 15 NM away is received just prior to the receiver closing (shutting off to replies) at 280 $\mu$sec, limiting the range of the typical BASCAS to 15 nautical miles. It is also to be understood that for the alarms 122 and 123 to be activated requires that two replies, with an indication of closing range, must be received. That is, alarm 122 would be sounded after 2 seconds plus 92.1–97.1 $\mu$seconds from $t_o$, the time of the first challenging transmission.

Figure 13:
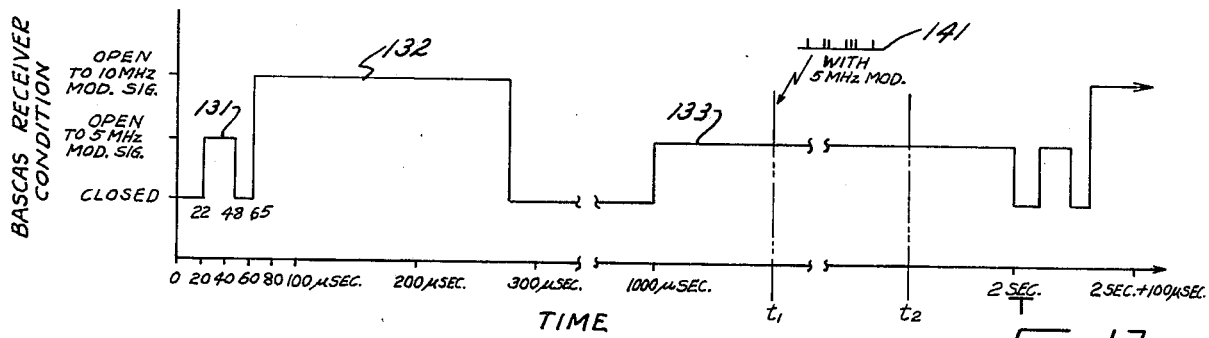
FIG. 13 graphically illustrates a typical complete 2 second cycle of operation of a BASCAS receiver with an interrogation challenge, (a 1090 MHz Mode C altitude signal with 5 MHz modulation), received at time $t_1$.

Typical BASCAS receiver operation for a full cycle of operation, $t_o$ to T, plus an additional overlapping 100 $\mu$seconds, is illustrated in FIG. 13. This clearly illustrates the times during the cycle that the receiver is closed and the time 131 (22 $\mu$sec to 48 $\mu$sec) that the receiver is open to receive its own altitude, the time 132 (65 $\mu$sec to 280 $\mu$sec) that the receiver is open to receive replies to its own BASCAS challenge, and the time 133 (from 1000 $\mu$sec up to T, the end of a two second cycle and the start of another cycle) in which the receiver is open to challenging BASCAS units from other aircraft.

Figure 14:
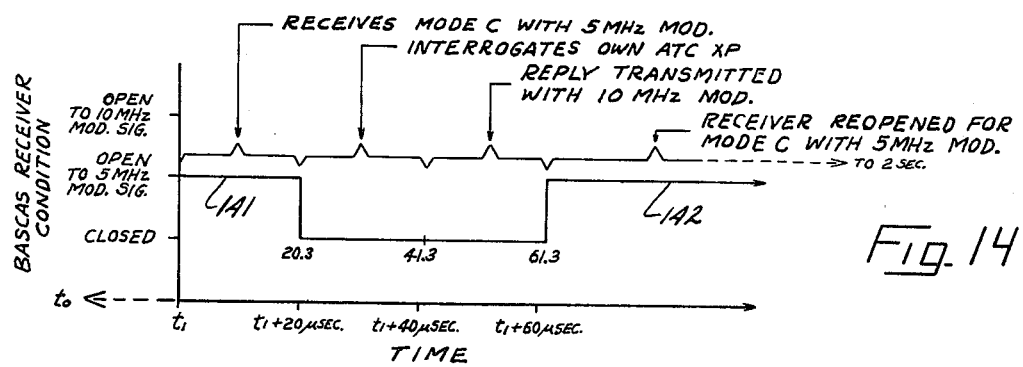
FIG. 14 graphically illustrates the typical operation of a BASCAS unit to the interrogation received at time $t_1$ in FIG. 13.

For illustration, it is assumed that at time $t_1$ a BASCAS challenge is received from another aircraft. As previously stated, this signal 141 will be a Mode C reply (1090 MHz) having 5 MHz modulation on the signal. The typical receiver reaction to this signal is illustrated in FIG. 14. The challenging Mode C signal with 5 MHz modulation 141 is approximately 20 $\mu$seconds long. After this signal is received the BASCAS receiver closes while the BASCAS unit interrogates its associated ATC transponder and then the ATC transponder signal is modulated with 10 MHz and radiated. This takes up to approximately $t_1+60$ $\mu$seconds, after which the BASCAS receiver is again open 142 to other challenges, up to time T the starting of a new cycle. If at some time such as $t_2$ an aircraft control center transmits a standard ATCRBS challenging signal (1030 MHz, 21 $\mu$sec spacing, no modulation) nothing happens in the BASCAS and the ATC transponder radiates (without any BASCAS modulation) the standard Mode C reply signal, i.e., a 1090 MHz signal with 20.3 $\mu$sec brackets around altitude code pulses. No BASCAS action occurs.

Typical operating range characteristics for the embodiments just described are as follows:

| Parameter | Worstcase | Typical Case |
|---|---|---|
| BASCAS Input Sensitivity | −72 dBm | −75 dBm |
| Loss, Cable to Antenna | 3 dB | 2 dB |
| Gain, Antenna | 0 dBi | + 2 dBi |
| Transponder Power | +54 dBm | +56 dBm |
| Loss through BASCAS Unit | 1.5 dB | 1.0 dB |
| Gain, Antenna | 0 dBi | + 2 dBi |
| TOTAL | 121.5 dB | 132 dB |
| Maximum BASCAS Range | 14 NM | 47 NM |

Note however that it is generally preferred to limit the range to 15 NM by receiver gating.

The typical impact of BASCAS on ATCRBS operating range is as follows:

| Parameter | |
|---|---|
| Reply Path Minimum ERP of Transponder | +54 dBm |
| Minimum Sens. of Gnd. Station | −103 dBM |
| TOTAL | 157 dBM |
| Interrogate Path Minimum ERP of Gnd. Station | +82.5 dBM |
| Minimum Sens. of Transponder Acft | −74 dBM |
| TOTAL | 156.4 dB |

Interrogate/Reply Path Ranges Equals 775 NM. A reduction of 2 dB maximum to add BASCAS to aircraft would cut ATCRBS range to 615 NM. However, the U.S. National Standard for ATCRBS requires a system range of 1 to 200 NM in normal instances.

It can thus be seen that the preferred embodiments of the BASCAS as herein described provide adequate operating range for the BASCAS system yet cause no detrimental effects on the U.S. ATCRBS system.

Additional typically preferred range-rate circuitry parameters have been determined to be the following:

a. Minimum detectable closing rate is 50 knots, or 84.39 ft/sec. Every two-second BASCAS cycle allows aircraft to close 168.78 feet. The signal is received sooner due to the shorter path by an amount (337 feet) ÷ ($9.84 \times 10^8$ ft/sec) equals 0.3 microsecond.

b. Maximum detectable closing rate is 1000 knots, or 1687.8 ft/sec. Every two-second BASCAS cycle allows aircraft to close 3375.6 feet. The signal is received sooner due to the shorter path by an amount (6751.2 feet) ÷ ($9.84 \times 10^8$ ft/sec) equals 6.86 microseconds.

A typical BASCAS receiver-decoder unit has three external electrical connectors. Two coaxial connectors are provided for a link between the ATC transponder and antenna. The third connector has multiple connections for the purposes of applying external power, providing pilot headset audio tone, interface to the cockpit indicator control panel, and interface to the external altimeter and landing gear switch inputs. The indicator control panel has a single electrical connector for interface to the receiver-decoder and external inputs. Obviously, the interface to the aircraft circuits may either be made at the BASCAS transponder or at the BASCAS control panel.

If desired, conventional built-in-test circuitry is provided which will determine satisfactory operating condition of the BASCAS alarm components. The pilot initiates a self-test sequence by depressing a momentary switch on the control panel. Sounding of the aural warning and lighting of the CLIMB and DIVE lights are the resulting indications of satisfactory system readiness.

Figure 11:
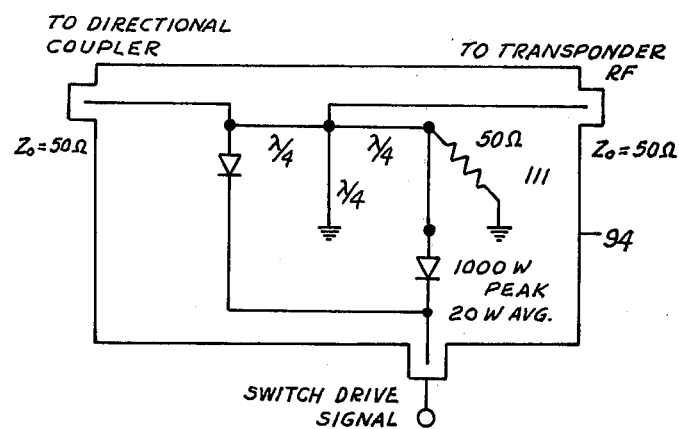
FIG. 11 is a schematic diagram of a suitable, typical, PIN diode high-power modulator.
Figure 9:
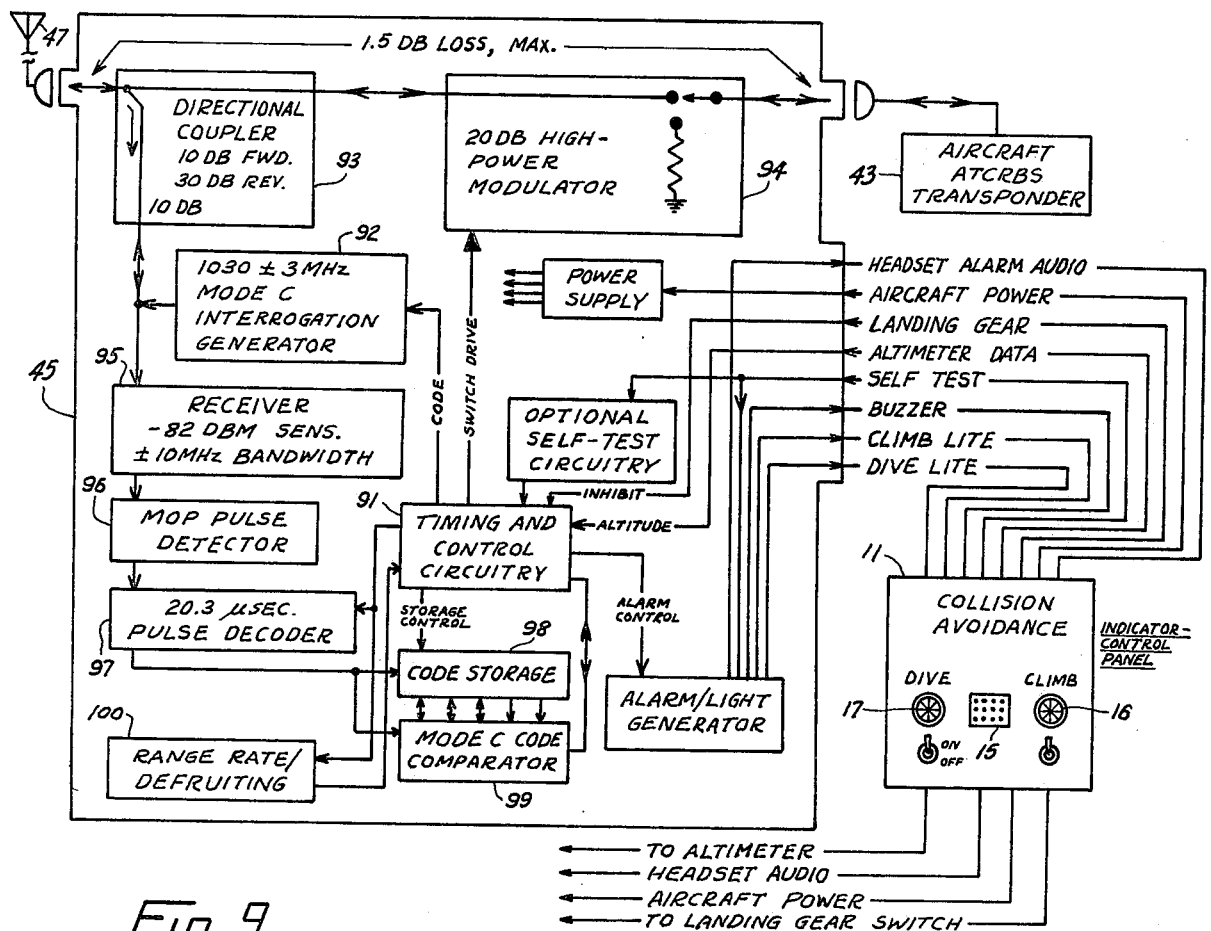
FIG. 9 is a typical block diagram of an embodiment of the invention.

It is to be noted that the invention is comprised of a system of well known components. The electronic circuits for performing the functions indicated by the blocks in FIG. 9 are well known conventional circuits using conventional components. Even the circuits of the oscillator as illustrated schematically in FIG. 10 and the modulator as illustrated schematically in FIG. 11 are set forth as examples and are not to be considered critical or limiting to the scope of the invention, as other circuits of oscillators and modulators performing the indicated function may satisfactorily be utilized.

I claim:

1. In an air traffic control radar beacon system (ATCRBS), having an air traffic control (ATC) transponder with ATCRBS mode C altitude information signal reply, cooperating with an antenna, the improvement, a beacon add-on subsystem for collision avoidance system (BASCAS), for providing collision avoidance indication, said improvement comprising:

a. means cooperating with the said ATC transponder and the said antenna for storing said mode C altitude information,
   b. means for radiating said mode C altitude information with an added determined first modulation frequency;
   c. means cooperating with the said antenna for receiving a mode C altitude information signal having an added determined first modulation frequency and receiving a mode C altitude information signal reply having an added determined second modulation frequency;
   d. means for comparing the said stored altitude information with the received altitude information from said signal reply having said second modulation frequency and providing an indication responsive to the said comparison; and
   e. said means for radiating cooperating with the said antenna, said ATC transponder, and said means for receiving mode C altitude information signals having the said added determined first modulation frequency to radiate mode C altitude information signals having the said determined second modulation frequency.

2. A beacon add-on subsystem for collision avoidance system (BASCAS) cooperating with an air traffic control radar beacon system (ATCRBS), having an air traffic control (ATC) transponder with ATCRBS mode C altitude information reply, cooperating with an antenna, said BASCAS for providing collision avoidance indication, comprising:

a. means for interrogating the said ATC transponder to provide a mode C altitude information reply;
   b. means for modulating the said mode C altitude information reply at a determined first modulation frequency;
   c. means for storing the said altitude of the said altitude information reply;
   d. means cooperating with the said antenna for receiving modulated mode C altitude information signals modulated at a determined second modulation frequency; and
   e. means for comparing the said stored altitude and the said received altitude modulated at the said second modulation frequency and providing an indication of the comparison.

3. The apparatus as claimed in claim 2 wherein the said means for receiving mode C altitude information signals modulated at a determined second modulation frequency includes means for additionally receiving mode C altitude information signals modulated at the said determined first modulation frequency, and the said means for modulating the said mode C altitude information reply at a determined first modulation frequency includes means for additionally modulating the said mode C altitude information reply at the said determined second modulation frequency, said receiving means and said modulating means cooperating with the said ATC transponder, to provide a mode C altitude information signal modulated at the said second modulation frequency responsive to a received mode C altitude information signal modulated at the said determined first modulation frequency.

4. A beacon add-on subsystem for collision avoidance system (BASCAS) cooperating with an air traffic control (ATC) transponder cooperating with an antenna for radiating mode C altitude information reply signals at approximately 1090 MHz responsive to a received 1030 MHz interrogative signal from an air traffic control radar beacon system (ATCRBS), the said BASCAS comprising:

a. means for generating a 1030 MHz self interrogation signal for triggering the said transponder to provide a 1090 mode C altitude information signal;

b. means for storing the said altitude provided by the self interrogation of the said transponder;

c. means cooperating with the said transponder, the said antenna, and the said means for self interrogation, for radiating as an interrogation signal a said 1090 MHz mode C altitude information signal provided by the said transponder with approximately a 5 MHz modulation, and for radiating as a reply signal a said 1090 MHz mode C altitude information signal provided by the said transponder with approximately a 10 MHz modulation;

d. means cooperating with the said antenna for receiving 1090 MHz mode C altitude information signals modulated with approximately 10 MHz modulation received as a reply to said interrogation signal, and receiving 1090 MHz mode C altitude information signals modulated with approximately 5 MHz modulation received as an interrogation signal;

e. means for comparing the said stored altitude and the said received altitude of the said mode C altitude information signal having approximately 10 MHz modulation and providing an indication responsive to the said comparison; and f. said means for radiating cooperating with the said means for receiving 1090 MHz interrogation mode C altitude information signals modulated with approximately 5 MHz modulation, the said means for self interrogation, and the said means for radiating as a reply signal the said 1090 MHz mode C altitude information signal having the said 10 MHz modulation providing a reply to the said received interrogation signal.

* * * * *